Dec. 6, 1966   J. S. KESSLER   3,290,003
VALVE CONSTRUCTION FACILITATING REMOVAL OF PARTS
Original Filed Oct. 23, 1959

INVENTOR.
JOSEPH S. KESSLER
BY
John W. Michael
ATTORNEY

United States Patent Office 3,290,003
Patented Dec. 6, 1966

3,290,003
VALVE CONSTRUCTION FACILITATING
REMOVAL OF PARTS
Joseph S. Kessler, Kenosha, Wis., assignor to G & H
Products Corporation, Kenosha, Wis., a corporation of
Wisconsin
Continuation of application Ser. No. 848,402, Oct. 23,
1959. This application Oct. 29, 1962, Ser. No. 233,967
1 Claim. (Cl. 251—318)

This invention relates to valves and particularly to remote controlled valves designed for flow control of dairy and other food products.

This is a continuation of my prior filed co-pending application, Serial No. 848,402, filed October 23, 1959, and since abandoned.

This invention in particular concerns valves which call for frequent inspection and cleaning. Such valves are most often found in the dairy and other food industries in which inspection, washing or sterilization of the various machine parts, as valves, is required at daily or shorter intervals. One of the important features of valves used in these industries is the easy and quick accessability of the parts coming in contact with the product. Another desirable feature is the ability to quickly remove these parts for their inspection and washing or sterilization. The importance of these features is appreciated if it is realized that these high, almost clinical, sanitary standards are imposed upon a production industry where stoppage of production for inspection, washing and sterilization constitutes very expensive down time. Prior to this invention it was necessary to at least partially disassemble the power actuator of the valves to provide sufficient access to the various valve parts to permit the required inspection and cleaning.

It is the object of this invention, therefore, to provide a valve which can be quickly and easily disassembled for inspection, cleaning and repair as necessary.

Another object of this invention is to provide a power actuated valve which can be disassembled for inspection without disassembly of the power actuating mechanism itself.

This object is attained by a valve comprising a valve housing having an inlet and an outlet and a valve seat in the housing adapted for cooperation with a valve member to control flow between the inlet and outlet. The valve further includes a cage member having a base and a plurality of upstanding legs removably mounted on the housing and a valve actuator removably mounted on the cage member. The valve member in the housing is operatively connected to the actuator by a two-piece stem comprising two sections joined end-to-end by quick-disconnect means. One of said stem sections is slidably mounted in the base of the cage and extends through the base into the valve housing. The joint between the stem sections is accessible from outside the valve housing between the upstanding legs of the cage member. The quick-disconnect means are secured to the upper stem section and engage a groove in the lower stem section so as to permit the lower stem section to readily drop out from the valve assembly upon actuation of the quick-disconnect means. Thus, the valve can be disassembled for inspection by simply removing the clamps or other fastening means holding the valve housing and actuator to the cage member and disconnecting the two stem sections by reaching between the legs of the cage member. This permits complete removal of the lower stem section for inspection and cleaning of the O-ring seal on the stem and other areas wherein dirt is likely to accumulate without disassembling the actuator as formerly was the case.

Other objects and advantages will be pointed out in, or be apparent from the specification and claim, as will obvious modifications of the single embodiment shown in the drawings, in which:

Figure 1:
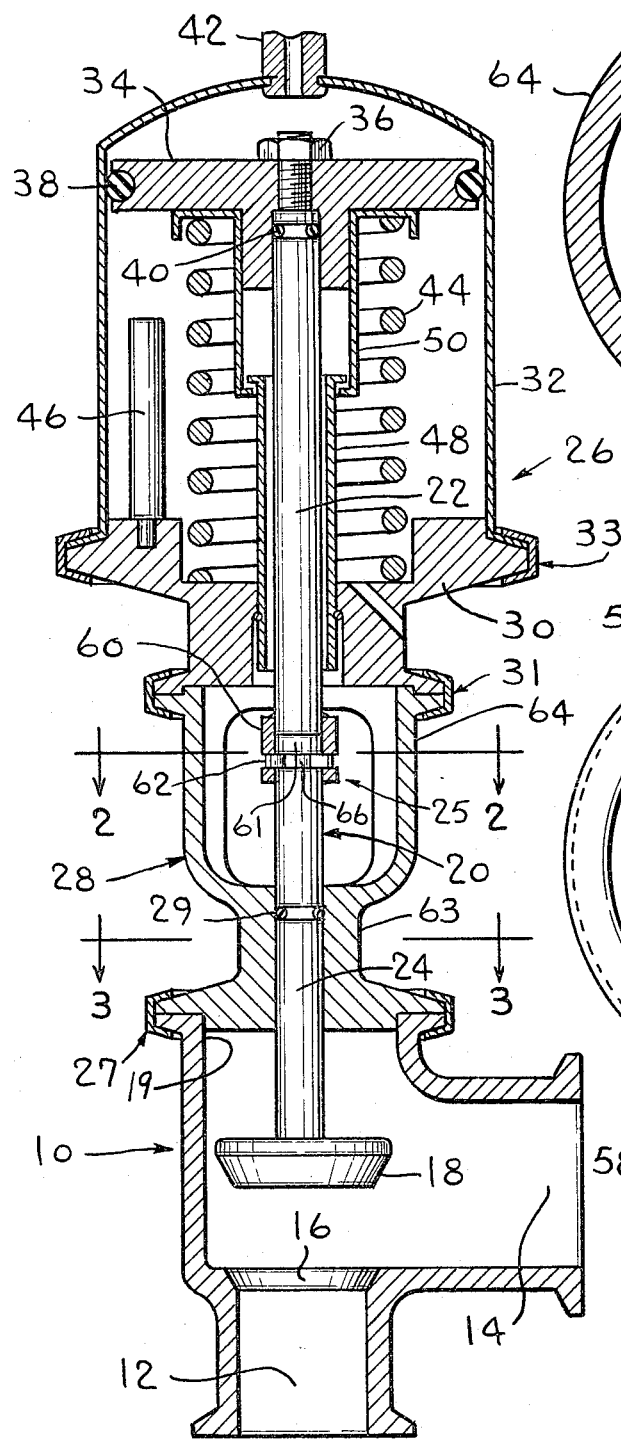
FIG. 1 is a vertical sectional view taken through a valve embodying my invention.

Referring now to the drawings in detail, FIG. 1 shows a remote controlled valve operated by a pneumatic actuator. It should be understood, however, that the improved valve structure of my invention could be used with other types of actuators such as a solenoid for example.

The valve includes a housing 10 having ports 12 and 14 adapted for connection to fluid lines through which flow is to be controlled. A seat 16 is formed in the housing and adapted for engagement by a valve member 18 which extends into the housing through an inspection opening 19. Valve 18 is mounted at the end of a two-piece stem 20 having an upper section 22 and a lower section 24 removably connected by a joint 25. Valve member 18 is actuated between open and closed positions by a pneumatic actuator designated generally by the reference numeral 26. The lower section 24 of stem 20 is slidably mounted in a cage or yoke member 28 which itself is removably mounted at inspection opening 19 of valve housing 10 by a clamp 27. Cage 28 has a base 63 and upstanding legs 64 with stem section 24 sealed in base 63 of the cage by an O-ring 29 to prevent leakage from inside housing 10. In assembled position base 63 of cage 28 serves as part of the housing wall closing inspection opening 19. The upper section 22 of the stem is slidably mounted in a base member 30 of the pneumatic actuator which, in turn, is removably mounted on the upper end of cage 28 by a clamp 31, as shown.

Pneumatic actuator 26 is of conventional design and includes a sealed bonnet 32 removably mounted on base 30 by a clamp 33. A piston 34 is slidably mounted in the bonnet and fastened to the upper end of stem section 22 by a nut 36. The space inside the bonnet above the piston is sealed by an O-ring 38 on the periphery of piston 34 and an O-ring 40 on the stem. Thus, it is seen that when air pressure is applied to the top of piston 34 through a fitting 42, the piston will be forced downwardly against the bias of a return spring 44 causing valve member 18 to seat on seat 16 and thereby shut off fluid flow through the valve. The downward movement of piston 34 is limited by a stop member 46 mounted on base 30 and the return movement of the piston under the bias of spring 44 is limited by a pair of interlocking sleeves 48 and 50, as shown.

Figure 2:
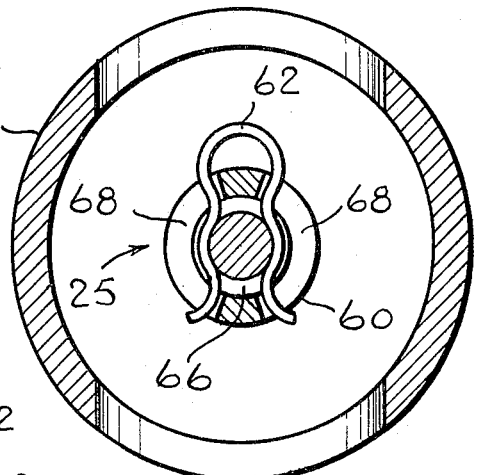
FIG. 2 is a horizontal sectional view taken along line 2—2 of FIG. 1.
Figure 3:
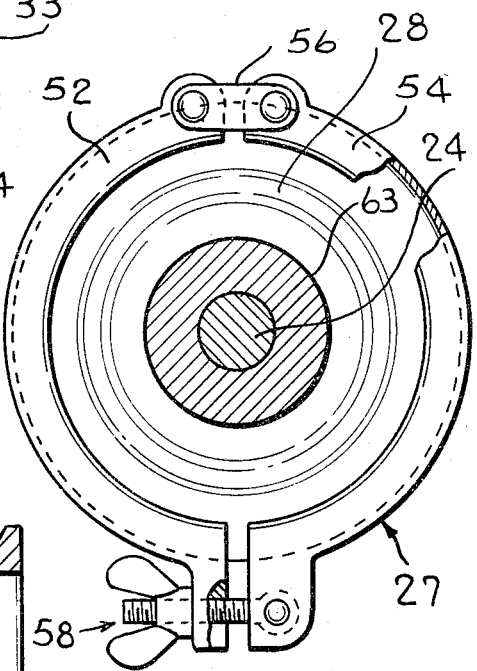
FIG. 3 is a horizontal sectional view taken along line 3—3 of FIG. 1.

Clamps 27, 31 and 33 and joint 25 may be of any suitable design permitting ready removal and reconnection of the parts. As shown in detail in FIG. 3, clamp 27 includes a pair of semi-circular channel members 52 and 54 pivotally connected at one end by a link 56 and releasably connected at the other end by a bolt and wingnut assembly 58 pivotally connected to member 54 and adapted to engage and tighten against member 52 to securely connect the parts. Similarly, joint 25 between stem sections 22 and 24 may be of any suitable design such as that shown in FIGS. 1 and 2. The joint includes a cylindrical collar 60 welded or otherwise fastened to the end of stem section 22 and adapted for telescopic engagement with the end portion 61 of stem section 24. To lock the two parts together a wire clamp pin 62 is inserted between legs 64 of cage member 28 for engagement in a groove 66 in end portion 61 as clearly shown in FIG. 2. To make the connection, end portion 61 is inserted in the collar with groove 66 positioned in alignment with a pair of oppositely facing circumferential openings 68 in the wall of collar 60 through which the legs of pin 62 clamp to grip end portion 61 by engagement with groove 66. In this arrangement the walls of groove 66 serve as stop means when engaged with the legs of pin 62 and prevent relative longitudinal movement of one stem section in respect to the other.

It should be apparent to those skilled in the art that an essential feature of the quick-disconnect means described above is that lower stem section 24 is so engaged as to permit it to freely drop out from base 63 of the valve assembly upon disengagement of the quick-disconnect means. For this reason stem section 24 is provided with a groove 66, which of course will not interfere in removing the stem section from the base, and stem section 22 has attached to it cylindrical collar 60.

Thus, it is seen that when it is desired to disassemble the valve for inspection of its parts clamps 27 and 31 are removed and stem sections 22 and 24 are disconnected by removing pin 62. This permits removal of stem section 24 for inspection of O-ring 29 and other areas where wear and dirt accumulation are likely to occur. The advantage of this construction will be appreciated when it is remembered that in prior constructions utilizing one-piece stems it was necessary to remove bonnet 32 and piston 34 before the stem could be sufficiently exposed to permit a complete inspection thereof. Although the removal of the clamp 31 is not necessary for the removal of the valve member and its stem section from the cage, the clamp 31 facilitates thorough cleaning of those cage sections which do come in contact with the products conveyed through the valve. In many cases such cleaning has to be performed at a location other than where the valve is installed, and for this reason I find it very practical to connect the cage member to the base 30 by the illustrated clamp 31 and thereby render all parts which come in contact with the products removable from the installation place of the valve assembly.

Although but one embodiment of the present invention has been illustrated and described, it will be apparent to those skilled in the art that various changes and modifications may be made therein without departing from the spirit of the invention or from the scope of the appended claim.

What I claim is:

A valve comprising, a valve body having an inlet and an outlet, a valve seat in said housing, a valve member movable within said housing and adapted for cooperation with said valve seat to control flow between said inlet and said outlet, a cage member removably mounted on said housing and having a base portion and a plurality of upstanding legs, a valve actuator removably mounted on said cage member, a two-piece stem comprising first and second stem sections joined end-to-end, said two-piece stem operatively connecting said actuator and said valve member with the first section of said two-piece stem slidably mounted in said base and extending through said base into said valve housing, said second stem section operatively connected to said actuator, said first stem section having a groove in the portion extending through said base and sealing means contained in said groove to provide a seal between said first stem section and said base, and connector means for said two-piece stem adapted for readily connecting and disconnecting said stem sections, said connector means including a collar fastened to the end of said second stem section and adapted for telescopic engagement with the end of the said first stem section, said connector means further including a locking member mounted in said collar and a second groove in said first stem section, said locking member adapted for removable engagement with said second groove in said first stem section to readily disconnect said stem sections upon actuation of said locking member and to permit slidable removal from said base of said first stem section and sealing means, said cage member removably mounted on said housing and said valve actuator removably mounted on said cage member by two-piece clamping members pivotally connected together at one end and releasably connected at the other end.

References Cited by the Examiner

UNITED STATES PATENTS

| 997,038 | 7/1911 | Brummer | 251—60 X |
| 2,405,476 | 8/1946 | Weatherhead | 251—86 X |
| 2,701,119 | 2/1955 | Smith | 251—320 |

FOREIGN PATENTS 42,094  1907  Switzerland.

WILLIAM F. O'DEA, *Primary Examiner.*

ISADOR WEIL, *Examiner.*

R. GERARD, *Assistant Examiner.*